United States Patent Office 3,306,918
Patented Feb. 28, 1967

3,306,918
ORGANIC TITANATES
Leslie M. Schenck, Mountainside, N.J., and Leslie G. Nunn, Jr., New York, N.Y., assignors to General Aniline & Film Corporation, New York, N.Y., a corporation of Delaware
No Drawing. Filed Jan. 13, 1964, Ser. No. 337,123
9 Claims. (Cl. 260—429.5)

This invention relates to an improved method for the production of organic titanates (titanium esters) and to the novel titanates of certain hydroxylic organic compounds which are produced by this method.

It is well known in the art that the reaction of titanium tetrachloride with aliphatic alcohols of the general formula, ROH does not proceed beyond the replacement of 2 chlorine atoms as shown in Equation 1.

(1) $\quad TiCl_4 + 2ROH \rightarrow TiCl_2(OR)_2 + 2HCl$

Formation of titanium tetraesters require the addition of acid acceptors such as sodium alcoholate, ammonia or amines. The Nelles process which is described in U.S. Patent 2,187,821 and is shown in Equation 2 employs ammonia.

(2) $\quad TiCl_4 + 4ROH + 4NH_3 \rightarrow Ti(OR)_4 + 4NH_4Cl$

Since the reaction in the Nelles process is exothermic, external cooling is required. Usually reaction is carried out in a hydrocarbon solvent in which ammonium chloride is insoluble. Insoluble ammonium chloride is usually removed by filtration and the hydrocarbon solvent is removed by distillation. The organic titanate remains as a residue and is purified by vacuum distillation. Other variations of the Nelles process have been developed. For example, U.S. Patent 2,655,523 describes carrying out the reaction in liquid ammonia, and U.S. Patent 2,654,770 describes the use of formamide as the solvent. In both of these variations the byproduct, ammonium choride, is soluble in the solvent and the titanate separates as a distinct layer. Use of the Nelles process and its variations is limited to those titanates which may be purified by distillation, separation or solvent extraction.

An object of this invention is to provide an improved method for the preparation of titanates of certain hydroxylic organic compounds. Another object of this invention is to provide a process for the preparation of titanates that does not require purification of the ester by distillation, separation or solvent extraction. It is also an object of this invention to provide a process which does not require cooling or the use of acid acceptors. A further object is to eliminate the need for separation and removal of byproducts obtained in the reaction of hydrogen chloride with acid acceptors. Another object is to provide a process for the manufacture of titanates that are not easily isolated by distillation or separation. A further object is to provide a process for the manufacture of titanates in high states of purity as well as to control the composition of the titanates within close limits. Another object is to provide new and novel titanates of certain hydroxylic compounds by this process. These and other objects of this invention will become apparent as this description proceeds.

The attainment of the objectives of this invention is made possible by our discovery that organic, polyoxyalkylene ether titanates are produced by the ester exchange between polyoxyalkylene ethers of organic compounds such as those normally used as nonionic surfactants (surface active agents) and aryl titanates under conditions of reduced pressures and elevated temperatures. We have found in this ester exchange that one mole of the polyoxyalkylene ether of an organic compound may be used to displace one of the aryl groups in an aryl titanate under conditions of reduced pressures and elevated temperatures and that the displaced aryl radical may be removed by vaporization from the reaction mixture in the form of the hydroxylic derivative of the aryl radical, that is, as an aryl alcohol. For example, when tetraphenyl titanate is used in this ester exchange process, the ether displaces phenyl radicals from the aryl titanate, which may be removed from the reaction mixture by vaporization in the form of phenol.

We have found that this ester exchange reaction may be used in a stepwise manner to displace each of the 4 aryl radicals in a tetraaryl titanate to form new and novel tetra polyoxyalkylene ether titanates. This method provides a process for the manufacture of high purity titanium esters and has the advantage that the process may be conducted in simple distillation equipment without the use of solvents, filtration equipment or other techniques required by the prior art. We have found that this method provides an economical process for the manufacture of these polyoxyalkylene ether titanates which were not readily obtainable by the methods used by the prior art.

This method may be carried out under anhydrous conditions at temperatures in the range from 125° to 300° C., reduced pressures in the range of 0.1 to 50 mm. and reaction periods of 1 to 20 hours. In general, we prefer to carry out this reaction at temperatures of about 200° to 250° C., reduced pressures of 1 to 15 mm. and reaction periods of 1.5 to 10 hours.

The usual procedure for carrying out the process disclosed by this invention is to react from 1 to 4 moles of a polyoxyalkylene ether of an organic compound with one mole of an aryl titanate under the reaction conditions indicated above. If desired, the polyoxyalkylene ether may be added in a stepwise manner e.g., one mole may be reacted with the aryl titanate and the resulting one mole of the hydroxylic derivative of the aryl radical removed from the reaction mixture to obtain a titanate having one ether group and three aryl groups. An additional mole of the same ether or a dissimilar ether may then be added to obtain a titanate having two ether groups and two aryl groups. This process may be repeated until a total of 4 moles of polyoxyalkylene ethers are reacted with the aryl titanate and all of the aryl groups are displaced to obtain a titanate having four ether groups.

As examples of the polyoxyalkylene ethers of organic compounds which may be used in the preparation of titanates by the process disclosed in this invention, we prefer to use those that are known commercially as nonionic surfactants. These surfactants are well known in the art and have many commercial uses. A preferred group of nonionic surfactants which may be employed in the practice of this invention is the polyoxyalkylated derivatives of alkylphenols and monohydric alcohols, particularly the polyoxyethylated derivatives.

These nonionic surfactants may be represented by Formula I:

(I) $\quad RO(R^1O)_{m-1}(CH_2CH_2O)_nH$ wherein R is either an alkyl radical containing from 6 to 28 carbon atoms, an aryl radical containing from 6 to 14 carbon atoms, an alkylaryl radical containing from 7 to 42 carbon atoms, an arylmethylene (benzyl) radical or an alkylarylmethylene (alkylbenzyl) radical containing from 7 to 43 carbon atoms, $R^1$ is the divalent residue of a vicinal epoxide containing from 2 to 12 carbon atoms, $m$ is an integer of from 1 to 150 and $n$ is an integer of from 1 to 150.

In Formula I, R may be either a straight or branched chain alkyl radical containing from 6 to 28 carbon atoms as hexyl, octyl, nonyl, decyl, hendecyl, dinonyl, dodecyl, tridecyl, tetradecyl, hexadecyl, heptadecyl, octadecyl, nonadecyl, eicosyl, heneicosyl, docosyl tricosyl tetracosyl, pentacosyl, hexacosyl, heptacosyl, myricyl, their isomers, their mixtures or the like. R may also be an aryl radical of from 6 to 14 carbon atoms such as phenyl, diphenyl, naphthyl, 2- and 5-anthryl or the like. Likewise, R may be an alkylaryl radical containing from 7 to 42 carbon atoms such as tolyl (methylphenyl) ethylphenyl, propylphenyl, butylphenyl, diamylphenyl, octylphenyl, nonylphenyl, decylphenyl, dodecylphenyl, tetradecylphenyl, pentadecylphenyl, octadecylphenyl, dinonylphenyl, dioctadecylphenyl, their isomers, their mixtures or the like. R may also be an arylmethylene (benzyl) radical or an alkylarylmethylene radical containing from 7 to 43 carbon atoms such as benzyl, methylbenzyl, nonylbenzyl, diamylbenzyl, dodecylbenzyl, octadecylbenzyl, dioctadecylbenzyl, their isomers, their mixtures or the like.

Suitable methods for preparation of these nonionic surfactants are described in U.S. Patents 1,970,578; 2,213,477; 2,575,832; 2,593,112 and 2,676,975. The complete disclosures and teachings of these patents are incorporated herein by reference. In the preparation of these surfactants straight or branched chain alkyl alcohols, aryl alcohols, or arylmethyl alcohols and their alkylated derivatives may be reacted with the vicinal epoxide either singly or in combination with each other.

Suitable vicinal epoxides for preparation of these nonionic surfactants include those compounds which can be represented by Formula II.

(II) 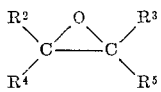

wherein the radicals designated as $R^2$, $R^3$, $R^4$ and $R^5$ individually can be hydrogen and alkyl, alkenyl, haloalkyl, haloalkenyl, aryloxalkyl, or the like groups, and two of the radicals designated as $R^2$, $R^3$, $R^4$ and $R^5$ may be taken together to form a cycloalkyl group, preferably wherein the said groups have from 1 to 10 carbon atoms. Thus in Formula I above, the radical $R^1$, which represents the divalent residue of a vicinal epoxide, can be represented by Formula III.

(III) 

wherein the radicals $R^2$–$R^5$ have the same values as stated above for Formula II.

Representative groups of vicinal epoxides which can be employed include, among others, the alkylene oxides, the epoxyalkenes, the aliphatic haloepoxides, the aryloxy-substituted alkylene oxides, the epoxycycloalkanes, and the like which preferably have from 2 to 12 carbon atoms. Specific examples of vicinal epoxides which can be employed include, among others, ethylene oxide, 1,2-epoxypropane, the epoxybutanes, 3,4-epoxy-1-butene, the epoxypentanes, 3,4-epoxy-1-pentene, the epoxyhexanes, the epoxyheptanes the epoxyoctanes, the epoxynonanes, the epoxydecanes, the epoxydodecanes, 3-chloro-1,2-epoxypropane, 3-chloro-1,2-epoxybutane, 1-chloro-3,4-epoxy-1-butene, 1-chloro-2,3-epoxybutane, 3,4-dichloro-1,2-epoxybutane, 1,4-dichloro-2,3-epoxybutane, 1-chloro-2,3-epoxypentane, 4-chloro-2,3-epoxypentane, 3-chloro-1,2-epoxypentane, 1,4 - dichloro-2,3-epoxypentane, 1-chloro-2,3-epoxyhexane, the chloroepoxyheptanes, the chloroepoxyheptenes, the chloroepoxyoctanes, the chloroepoxyoctenes, the chloroepoxynonanes, the chloroepoxydecanes, 3-bromo-1, 2-epoxypropane, phenyl glycidyl ether, tolyl glycidyl ether, xylyl glycidyl ether and other alkyl-substituted-phenyl glycidyl ethers, epoxycyclohexane and alkyl-substituted epoxycyclohexanes, epoxycyclopentane and lakyl - substituted epoxycyclopentanes, 2,3-epoxybicyclo (2.2.1) heptane, or the like. Preferred vicinal epoxides include alkylene oxides such as ethylene oxide, 1,2-epoxypropane, the epoxybutanes, or the like, and saturated aliphatic haloepoxides such as 3-chloro-1,2-epoxypropane, 3-bromo-1,2-epoxypropane, or the like. Thus, in one preferred embodiment of the invention, when an alkylene oxide is employed, Formula III can be represented as —$C_aH_{2a}$— wherein $a$ has a value of from 2 to 12; and when a saturated aliphatic haloepoxide is employed, Formula III can be represented as —$C_aH_{2a-r}X_r$— wherein $a$ has a value of from 2 to 12, X is a halo group, and $r$ has a value of 1 or 2.

When nonionics are produced by reaction with vicinal epoxides containing more than 2 carbon atoms, these surfactants should be reacted with at least one mole of ethylene oxide per mole of nonionic surfactant before they are employed in the present invention so that the polyoxyalkylene chain is terminated with an hydroxyl attached to the divalent residue of an ethylene oxide molecule. The number of moles of ethylene oxide which may be used in the manufacture of these nonionic surfactants may vary from 1 to 150 moles per mole of hydroxylic compound (phenolic or alcohol compound).

As examples of hydroxylic compounds which may be used in the process disclosed by this invention, there may be mentioned those polyoxyalkylated derivatives of phenol and alkylphenols in which the total number of alkyl carbon atoms on the phenolic molecule is from 1 to 36, those derivatives of aliphatic alcohols containing from 6 to 28 carbon atoms as well as those of benzyl alcohol and alkylbenzyl alcohols in which the total number of alkyl carbon atoms is from 1 to 36.

As examples of such alkylphenols there may be mentioned cresols, ethylphenols, propylphenols, butylphenols, amylphenols, hexylphenols, heptylphenols, octylphenols, nonylphenols, decylphenols, dodecylphenols, tetradecylphenols, octadecylphenols, their mixtures or their isomers. The polyoxyalkylated derivatives of secondary alkylphenols obtained by alkylation of phenols or cresols with α-olefins of the types obtained by the condensation of ethylene in the presence of Ziegler type catalysts or by wax cracking techniques are of particular value. α-Olefins useful in the preparation of these alkylphenols may contain odd or even numbers of carbon atoms. Mixtures of α-olefins having various ranges of carbon atoms such as $C_6$–$C_7$, $C_7$–$C_9$, $C_9$–$C_{11}$, $C_{11}$–$C_{15}$, $C_{15}$–$C_{20}$ and higher may be used in the preparation of these alkylphenols. Olefins containing even numbers of carbon atoms such as those derived from fats may be employed. Alkylphenols such as m-pentadecylphenols may be used. There may also be used the polyoxyalkylated derivatives of alkylphenols obtained by alkylation of phenol or cresol with dimers, trimers, tetramers, or the like of lower molecular weight olefins, such as propylene, butylene, amylene, their isomers or their mixtures. Likewise, di and trisubstituted alkylphenols obtained by alkylation of the above-mentioned alkylphenols may be used. As examples of such di and trialkylphenols, there may be mentioned nonylcresol, diamylphenol, didodecylphenol, dinonylcresol, tri-t-butylphenol, trinonylphenol, dioctadecylphenol or the like.

The polyoxyalkylene ether derivatives of alcohols containing from 6 to 28 carbon atoms are another preferred group of nonionic surfactants which may be employed in the present invention. These include the polyoxyalkylene ethers of hexyl alcohol, octyl alcohol, decyl alcohol, dodecyl alcohol, tetradecyl alcohol, hexadecyl alcohol, octadecyl alcohol, docosyl alcohol, heptacosyl alcohol, myricyl alcohol, their isomers, their mixtures, or the like. Alcohols useful in the preparation of these ethers may be produced by a variety of methods. For example, they may be prepared by the hydrogenation of fatty acids or glycerides. They may be prepared by the Oxo process. They may also be prepared by the Ziegler process as described in Kirk-Othmer, "Encyclopedia of Chemical Technology," v. 1, p. 540 (John Wiley & Sons, N.Y., N.Y., 2 ed., 1963).

Benzyl alcohol and alkylbenzyl alcohols in which the total number of alkyl carbon atoms is from 1 to 36 may also be used in the preparation of nonionic surfactants useful in this invention. Specific examples of benzyl alcohols which may be employed include among others, benzyl alcohol, p-methylbenzyl alcohol, o-ethylbenzyl alcohol, propylbenzyl alcohol, i-propylbenzyl alcohol, t-butylbenzyl alcohol, s-pentylbenzyl alcohol, n-hexylbenzyl alcohol, octylbenzyl alcohol, nonylbenzyl alcohol, dodecylbenzyl alcohol, tetradecylbenzyl alcohol, octadecylbenzyl alcohol, dinonylbenzyl alcohol, didecylbenzyl alcohol, dioctadecylbenzyl alcohol, their isomers, their mixtures or the like.

The following are examples of nonionic surfactants which may be employed as reactants in the manufacture of titanates by the process disclosed in this invention. In these examples of nonionic surfactants, E.O. represents ethylene oxide, Pr.O. propylene oxide, Bu.O. butylene oxide, Oc.O. octylene oxide, St.O. styrene oxide, Dd.O. dodecylene oxide, ClPr.O. chloropropylene oxide (3-chloro-1,2-epoxy propane) and the number immediately preceding each of these formulas refers to the number of moles of the oxide thereof reacted with one mole of the reactive hydrogen containing organic compound. Such nonionic surfactants include phenol+1E.O.,
phenol+5Bu.O.+1E.O.,
o-cresol+1Pr.O.+2E.O.,
diisobutylphenol+9E.O.,
nonylphenol+6E.O.,
diamylphenol+8E.O.,
dodecylphenol+2E.O.,
diamylphenol+1St.O.+10E.O.,
hexylphenol+4E.O.,
octadecylphenol+20E.O.,
dioctadecylphenol+150E.O.,
lauryl alcohol+4E.O.,
isooctyl alcohol (Oxo alcohols)+5E.O.,
decyl alcohol (Oxo alcohols)+150Pr.O.+150E.O.,
tridecyl alcohol (Oxo alcohols)+50E.O.,
tallow alcohol+30E.O.,
stearyl alcohol+70E.O.,
t-butylphenol+1Oc.O.+18E.O.,
phenol+1Dd.O.+12E.O.,
n-hexyl alcohol+1St.O.+11E.O.,
lauryl alcohol (Ziegler process)+15Pr.O.+20E.O.,
oleyl alcohol+40E.O.,
m-pentadecylphenol+90E.O.,
t-butylphenol+2ClPr.O.+10E.O.

or the like.

It will be understood that in some applications it may be beneficial to use nonionics derived from mixtures of alkylphenols or alcohols. Such mixtures may include alkylation mixtures containing mixed alkylphenols and unreacted olefins, alkylation mixtures that have been stripped to remove unreactive olefins, residues of alkylation mixtures that contain high boiling alkylphenols, crude alcohol mixtures prepared by the methods described above, alcohol mixtures containing dissimilar alcohols, mixtures of alcohols and phenols or the like. The advantages of such compositions as hydrophobes for nonionic surfactants are well known to those skilled in the art. Frequently, when mixtures containing isomers of dissimilar compounds are alkoxylated, they have unique and improved surfactant properties. As examples of such compositions that may be used to prepare polyalkoxylated derivatives, there may be mentioned alkylation mixtures of nonylphenol, still bottoms from dodecylphenol alkylations, alcohol mixtures obtained from hydrogenation of natural products such as vegetable and animal oils or alkoxylated admixtures obtained from the synthetic alcohol processes described above.

Aryl titanates and substituted aryl titanates which may be used in this invention include those compounds which can be represented by Formula IV (IV) 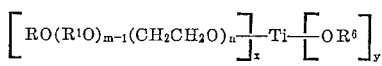

wherein $R^6$ is an aryl radical or a substituted aryl radical containing from 6 to 24 carbon atoms. Representative titanates include tetraphenyl titanate, tetra (o-cresyl) titanate, tetra (m-cresyl) titanate, tetra (p-cresyl) titanate, tetra (2,4-xylenyl) titanate, tetra (2,4-dichlorophenyl) titanate, tetra (hexylphenyl) titanate, tetra (nonylphenyl) titanate, tetra (dinonylphenyl) titanate, tetra (dodecylphenyl) titanate, tetra (2-naphthyl) titanate, their isomers, their mixtures or the like.

Polyoxyalkylene ethers of titanates which may be manufactured by the process disclosed in this invention include those titanates which may be represented by Formula V (V) $$[RO(R^1O)_{m-1}(CH_2CH_2O)_n]_x\text{—Ti—}[OR^6]_y$$

wherein R, $R^1$, $R^6$, $m$ and $n$ have the values assigned above and $x$ is an integer of from 1 to 4, $y$ is an integer of from 0 to 3 and the sum of $x$ and $y$ is 4.

The following examples illustrate the process disclosed by this invention. These examples are only illustrative of the invention and are not to be regarded as limitative. It will be understood that all parts, percentages and proportions referred to herein and in the appended claims are by weight unless otherwise indicated.

Example 1

A reaction mixture consisting of 139 g. of tetraphenyl titanate (0.33 mole) and 286 g. (1 mole) of a commercial nonylphenol ethoxylate having a mole ratio of 1.5 moles of ethylene oxide per mole of nonylphenol is gradually heated under anhydrous conditions from room temperature to 250° C. over 5 hours under reduced pressure (15 mm.). Phenol is distilled from the reaction mixture to obtain an almost quantitative yield of a residual viscous oil containing 4.6% Ti (theory 4.8%) and having the formula

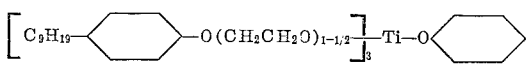

A product free of hydroxylic compounds is obtained. This product can be reacted with dihydroxylic compounds to produce dititanates and with higher polyhydroxylic compounds to form more highly condensed polytitanates.

Example 2

Three-hundred-eighty-nine grams of a 6 mole ethylene oxide adduct of commercial nonylphenol (0.8 mole) and 84 g. (0.2 mole) of tetraphenyltitanate are rapidly heated to 170° C. at 10 mm. pressure under anhydrous conditions. The temperature is slowly increased to 230° C. over 6 hours, and 73 g. of phenol is distilled from the reaction mixture. The product is a residual viscous oil containing 2.3% Ti (theory 2.4%) and having the formula

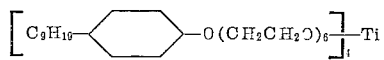

This product can be used to improve the water repellency of hydrocarbon waxes and silicone formulations for the treatment of leather and textiles.

Example 3

Example 1 is repeated with the exception that 286 g. of the commercial nonylphenol ethoxylate is replaced by 1791 g. (.33 mole) of phenol ethoxylated with 120 moles of ethylene oxide. A product having the following formula is obtained.

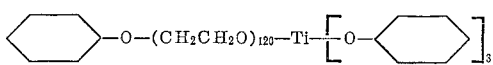

Example 4

The procedure in Example 2 is repeated with the exception that 503 g. (0.8 mole) of the 9.75 mole ethoxylate of tridecylalcohol is substituted for the 6 mole ethoxylate of commercial nonylphenol. The tridecylalcohol ethoxylate is prepared from a commercial alcohol produced by the Oxo process. The product is a residual oil having the following formula.

$$\left[ C_{13}H_{27}O(CH_2CH_2O)_{9.75} \right]_4 -Ti$$

This product can be used as a penetrating agent in water repellent formulations to improve water repellency.

*Example 5*

The procedure in Example 1 is repeated with the exception that 655 g. (0.66 mole) of a 15 mole ethoxylate of a commercial dinonylphenol is substituted for 286 g. of the commercial nonylphenol ethoxylate containing an average mole ratio of 1.5 moles of ethylene oxide per mole of nonylphenol. A product having the following formula is obtained.

$$\left[ \begin{matrix} C_9H_{19}- \\ C_9H_{19}- \end{matrix} \phantom{x}\bigcirc\phantom{x} -O(CH_2CH_2O)_{15} \right]_2 -Ti \left[ O \phantom{x}\bigcirc\phantom{x} \right]_2$$

*Example 6*

Example 1 is repeated with the exception that 2282 g. (0.33 mole) of an ethoxylate having a mole ratio of 150 moles of ethylene oxide per mole of 2,4,6-tri-tertiary-butylphenol is substituted for 286 g. of a commercial nonylphenol ethoxylate having a mole ratio of 1.5 moles of ethylene oxide per mole of monylphenol. A product having the following formula is obtained.

$$\left[ (CH_3)_3C\text{-substituted phenyl}-O(CH_2CH_2O)_{150} \right]_3 -Ti \left[ O \phantom{x}\bigcirc\phantom{x} \right]_3$$

*Example 7*

Example 1 is repeated with the exception that 186.1 g. (0.33 mole) tetra-p-chlorophenyltitanate was substituted for 139.0 g. tetraphenyltitanate. A product having the following formula is obtained.

$$\left[ C_9H_{19}- \phantom{x}\bigcirc\phantom{x} -O-(CH_2CH_2O)_{1-1/2} \right]_3 -Ti-O- \phantom{x}\bigcirc\phantom{x} -Cl$$

*Example 8*

Example 1 is repeated with the exception that 158.8 g. (0.33 mole) tetra-p-cresyltitanate is substituted for 139.0 g. tetraphenyltitanate. A product having the following formula is obtained.

$$C_9H_{19}- \phantom{x}\bigcirc\phantom{x} -O(CH_2CH_2O)_{1-1/2} \right]_3 -Ti-O- \phantom{x}\bigcirc\phantom{x} -CH_3$$

*Example 9*

Example 1 is repeated with the exceptions that 252.0 g. (0.33 mole) tetra (p-2-hexylphenyl) titanate is substituted for 139.0 g. tetraphenyltitanate and the reaction mixture is heated to 250° C. at 1 mm. to remove the hexylphenol liberated. A product having the following formula is obtained.

$$\left[ C_9H_{19}- \phantom{x}\bigcirc\phantom{x} -O(CH_2CH_2O)_{1-1/2} \right]_3 -Ti-O- \phantom{x}\bigcirc\phantom{x} -CH(CH_3)(CH_2)_3CH_3$$

*Example 10*

Forty-two grams (0.1 mole) of tetraphenyltitanate is reacted as in Example 1 with 313.6 g. (.4 mole) tridecyl alcohol alkoxylated with 4 moles of propylene oxide and then with 8 moles of ethylene oxide. A titanate having the following formula is obtained.

$$\left[ C_{13}H_{27}O-(CH_2CH(CH_3)O)_4(CH_2CH_2O)_8 \right]_4 -Ti$$

*Example 11*

Forty-two grams (0.1 mole) of tetraphenyltitanate is reacted with 344.0 g. (0.4 mole) nonylphenol alkoxylated with 4 moles butylene oxide and then with 8 moles of ethylene oxide under the conditions given in Example 1 to produce a product having the formula $$\left[ C_9H_{19}- \phantom{x}\bigcirc\phantom{x} -(CH_2CH(C_2H_5)O)_4(CH_2CH_2O)_8 \right]_4 -Ti$$

*Example 12*

The product of Example 3, 560 g. (0.1 mole)

$$\phantom{x}\bigcirc\phantom{x} -O(CH_2CH_2O)_{120}-Ti- \left[ O \phantom{x}\bigcirc\phantom{x} \right]_3$$

is reacted with 77 g. (0.1 mole) of the 10 mole ethylene oxide adduct of docosanol, $CH_3(CH_2)_{20}CH_2OH$ by heating at 170° C. to 230° C. at 10 mm. pressure until 9.4 g. (0.1 mole) phenol is removed to obtained a reaction product having the formula $$\phantom{x}\bigcirc\phantom{x} -O(CH_2CH_2O)_{120}-Ti(OCH_2CH_2)_{10}OCH_2(CH_2)_{20}CH_3 \text{ with two } O\bigcirc \text{ groups}$$

This product, 0.1 mole and the 5 mole ethylene oxide adduct of n-hexyl alcohol, 0.1 mole are then reacted under the same conditions to obtain a reaction product having the formula $$\phantom{x}\bigcirc\phantom{x} -O(CH_2CH_2O)_{120}-Ti-(OCH_2CH_2)_{10}OCH_2(CH_2)_{20}CH_3$$
with $(OCH_2CH_2)_5OCH_2(CH_2)_4CH_3$ and $O\bigcirc$ This product, 0.1 mole and the 20 mole ethylene oxide adduct of di-octadecyl phenol, 0.1 mole are reacted to obtain a reaction product having the formula $$\phantom{x}\bigcirc\phantom{x} O(CH_2CH_2O)_{120}-Ti-(OCH_2CH_2)_{10}OCH_2(CH_2)_{20}CH_3$$
with $(OCH_2CH_2)_5OCH_2(CH_2)_4CH_3$ and $(OCH_2CH_2)_{20}OC_6H_3(C_{18}H_{37})_2$

*Example 13*

Example 2 is repeated with the exception that a dodecylbenzyl alcohol ethoxylate having a molar ratio of 10 moles of ethylene oxide per mole of alcohol is substituted for the ethylene oxide adduct of nonylphenol. The reaction product is a titanate of the formula $$\left[ C_{12}H_{25}- \phantom{x}\bigcirc\phantom{x} -CH_2O(CH_2CH_2O)_{10} \right]_4 -Ti$$

*Example 14*

Example 2 is repeated with the exception that a nonionic surfactant having the formula $$C_{12}H_{25}O(CH_2CH_2CH(CH_2Cl)O)_4(CH_2CH_2O)H$$

is substituted for the ethylene oxide adduct of nonylphenol. The nonionic is obtained by reaction of 1 mole of lauryl alcohol with 4 moles of 3-chloro-1,2-epoxypropane followed by reaction with 1 mole of ethylene oxide. Reaction temperature is slowly increased to 230° C. over 7 hours to distill 73 g. of phenol from the reaction mixture. The product is a titanate having the formula $$\left[ C_{12}H_{25}O(CH_2CH_2O)_4(CH_2CH_2O)- \text{ with } CH_2Cl \right]_4 -Ti$$

Organic titanates produced by the process of this invention have many useful applications. For example, they may be employed as catalysts, surface coatings and intermediates for the manufacture of organic compounds and organic polymers, particularly those containing titanium. They may be used to coat materials such as cellulose, glass, plastics and other substances. When coatings of these titanates are hydrolyzed, they form adherent films on the surface of the materials coated which promote adhesion of the coated materials with other materials. When these esters are applied as coatings on glass and the coatings are pyrolyzed, scratch resistant coatings on the glass surfaces are formed. These titanates may also be employed as paint vehicles, crosslinking agents, catalysts for curing silicone resins, catalysts in ester exchange reactions and as intermediates in the manufacture of more highly condensed titanium esters. These esters are useful in the formulation of water repellents containing silicones, hydrocarbon waxes or the like. When they are used in silicone water repellents for leather, they act as penetrating agents to improve the penetration of leather fibers by the repellents. They also improve the water repellency of hydrocarbon waxes when they are used in combination with these waxes in water repellent formulations for textiles. These titanates may also be employed as grinding aids and dispersants for pigments. They may also be used as water repellents for masonry and as wetting agents and adhesion improvers in protective coatings.

This invention has been disclosed with respect to certain preferred embodiments. Various modifications and variations thereof will become obvious to persons skilled in the art. It is to be understood that such modifications and variations are to be included within the spirit and scope of this invention.

What is claimed:
1. An organic titanate that is represented by the formula

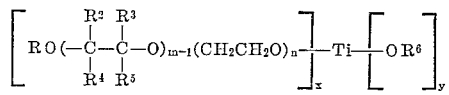

wherein R represents a member selected from the class consisting of alkyl radicals containing from 6 to 28 carbon atoms, aryl radicals containing from 6 to 14 carbon atoms, alkylaryl radicals containing from 7 to 42 carbon atoms, arylmethylene and alkylarylmethylene radicals containing from 7 to 43 carbon atoms, $R^2$, $R^3$, $R^4$ and $R^5$ individually represent members selected from the class consisting of hydrogen, alkyl, alkenyl, chloroalkyl, bromoalkyl, chloroalkenyl, phenoxyalkyl, and two of the members $R^2$–$R^5$ taken together to form a cycloalkyl, $m$ is an integer of at least 1, $n$ is an integer of at least 1, $R^6$ represents a member selected from the class consisting of aryl radicals, alkylated aryl radicals and halogenated aryl radicals containing from 6 to 24 carbon atoms, $x$ is an integer of from 1 to 4, $y$ is an integer of from 0 to 3 and the sum of $x$ and $y$ is 4.

2. An organic titanate that is represented by the formula

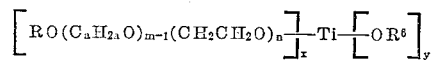

wherein R represents a member selected from the class consisting of alkyl radicals containing from 6 to 28 carbon atoms, aryl radicals containing from 6 to 14 carbon atoms, alkylaryl radicals containing from 7 to 42 carbon atoms, arylmethylene and alkylarylmethylene radicals containing from 7 to 43 carbon atoms, $a$ is an integer of from 2 to 12, $m$ is an integer of at least 1, $n$ is an integer of at least 1, $R^6$ represents a member selected from the class consisting of aryl radicals, alkylated aryl radicals and halogenated aryl radicals containing from 6 to 24 carbon atoms, $x$ is an integer of from 1 to 4, $y$ is an integer of from 0 to 3 and the sum of $x$ and $y$ is 4.

3. An organic titanate that is represented by the formula

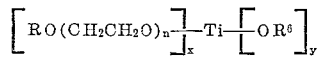

wherein R represents a member selected from the class consisting of alkyl radicals containing from 6 to 28 carbon atoms, aryl radicals containing from 6 to 14 carbon atoms, alkylaryl radicals containing from 7 to 42 carbon atoms, arylmethylene and alkylarylmethylene radicals containing from 7 to 43 carbon atoms, $n$ is an integer of at least 1, $R^6$ represents a member selected from the class consisting of aryl radicals, alkylated aryl radicals and halogenated aryl radicals containing from 6 to 24 carbon atoms, $x$ is an integer of from 1 to 4, $y$ is an integer of from 0 to 3 and the sum of $x$ and $y$ is 4.

4. An organic titanate as defined in claim 3, wherein R represents an alkylphenyl radical containing from 7 to 42 carbon atoms and $R^6$ represents a phenyl radical.

5. An organic titanate as defined in claim 3, wherein R represents an alkylphenyl radical containing from 7 to 42 carbon atoms and $R^6$ represents an alkylated phenyl radical.

6. An organic titanate as defined in claim 3, wherein R represents a dialkylphenyl radical containing from 18 to 42 carbon atoms and $R^6$ represents a phenyl radical.

7. An organic titanate as defined in claim 3, wherein R represents a dialkylphenyl radical containing from 18 to 42 carbon atoms and $R^6$ represents an alkylated phenyl radical.

8. An organic titanate as defined in claim 4, wherein R represents a nonylphenyl radical.

9. An organic titanate as defined in claim 6, wherein R represents a dinonylphenyl radical.

References Cited by the Examiner
UNITED STATES PATENTS

| | | | |
|---|---|---|---|
| 2,579,414 | 12/1951 | Boyd | 260—429 |
| 2,689,858 | 9/1954 | Boyd | 260—429 |
| 3,047,515 | 7/1962 | Purma | 260—2 |
| 3,121,109 | 2/1964 | Young | 260—485 |

OTHER REFERENCES

Arbuzo et al.: Chemical Abstracts 47 (1953), page 2684.

Cullinane et al.: J. Applied Chemistry 1 (1951), pages 400–406.

Nesmeyanov et al.: Akademia Nauk SSSR, Otdel. Khim. Nauk (1951), pages 518–523.

Speer: J. Org. Chemistry 14 (1949), pages 655–659.

HELEN M. McCARTHY, *Acting Primary Examiner.*

TOBIAS E. LEVOW, *Examiner.*

H. M. S. SNEED, *Assistant Examiner.*